(12) United States Patent
    Xiao et al.

(10) Patent No.: US 12,580,707 B2
(45) Date of Patent: Mar. 17, 2026

(54) DEVICE, NETWORK, AND METHOD FOR SOUNDING REFERENCE SIGNAL TRANSMISSION AND RECEPTION

(71) Applicant: Huawei Technologies Co., Ltd., Shenzhen (CN)

(72) Inventors: Weimin Xiao, Hoffman Estates, IL (US); Jialing Liu, Palatine, IL (US); Qian Cheng, Naperville, IL (US); Diana Maamari, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 17/391,256

(22) Filed: Aug. 2, 2021

(65) Prior Publication Data

US 2021/0359819 A1    Nov. 18, 2021

Related U.S. Application Data

(63) Continuation of application No. PCT/CN2019/080314, filed on Mar. 29, 2019.
(Continued)

(51) Int. Cl.
    *H04L 5/00*        (2006.01)
    *H04L 25/02*       (2006.01)
    (Continued)

(52) U.S. Cl.
    CPC ........ *H04L 5/0051* (2013.01); *H04L 25/0226* (2013.01); *H04W 72/0453* (2013.01); *H04W 72/23* (2023.01); *H04W 80/02* (2013.01)

(58) Field of Classification Search
    CPC . H04L 5/0051; H04L 25/0226; H04L 5/0098; H04L 5/0023; H04L 25/0224;
    (Continued)

(56) References Cited

U.S. PATENT DOCUMENTS 9,270,433 B2    2/2016  Chen et al.
2012/0039273 A1*  2/2012  Nam ................... H04W 52/325
                                                    455/450

(Continued)

FOREIGN PATENT DOCUMENTS

CN        103002585 A        3/2013
CN        105049164 A        11/2015

OTHER PUBLICATIONS

3GPP TSG RAN WG1 Meeting AH 1801; R1-1800192; Source: vivo; Title: Remaining issues and text proposals on SRS design; Vancouver, Canada, Jan. 22-26, 2018 (Year: 2018).*
(Continued)

*Primary Examiner* — Mohammed S Chowdhury
(74) *Attorney, Agent, or Firm* — Slater Matsil, LLP

(57) ABSTRACT

A network controller may transmit, to a communication device, information about a portion of a sounding reference signal (SRS) bandwidth, where the SRS bandwidth has been configured for the communication device for transmitting a SRS resource set via radio resource control (RRC) signaling. The communication device may then transmit the SRS resource set in the portion of the SRS bandwidth, upon being triggered by a downlink control information (DCI) message. The information about the portion of the SRS bandwidth may be transmitted in a DCI message or a medium access control (MAC) control element (CE).

20 Claims, 4 Drawing Sheets

400

Related U.S. Application Data

(60) Provisional application No. 62/800,336, filed on Feb. 1, 2019.

(51) Int. Cl.
| | |
|---|---|
| *H04W 72/0453* | (2023.01) |
| *H04W 72/23* | (2023.01) |
| *H04W 80/02* | (2009.01) |

(58) Field of Classification Search
CPC . H04W 72/0453; H04W 72/23; H04W 80/02; H04W 48/12
See application file for complete search history.

(56) References Cited

U.S. PATENT DOCUMENTS

| | | | | |
|---|---|---|---|---|
| 2014/0341167 | A1 | 11/2014 | Chen et al. | |
| 2019/0174466 | A1* | 6/2019 | Zhang | H04L 5/0057 |
| 2019/0281588 | A1* | 9/2019 | Zhang | H04W 52/08 |
| 2020/0028638 | A1* | 1/2020 | Liu | H04J 13/0062 |
| 2020/0106646 | A1* | 4/2020 | Liu | H04L 25/0226 |
| 2020/0107353 | A1* | 4/2020 | Jung | H04B 7/0689 |
| 2021/0058910 | A1* | 2/2021 | Yokomakura | H04L 5/0048 |
| 2021/0144029 | A1* | 5/2021 | Wang | H04L 5/0051 |
| 2021/0250149 | A1* | 8/2021 | Muruganathan | H04L 5/0051 |
| 2021/0258936 | A1* | 8/2021 | Takeda | H04L 5/0094 |
| 2021/0345390 | A1* | 11/2021 | Okamura | H04W 72/23 |
| 2021/0409178 | A1* | 12/2021 | Faxér | H04L 5/0053 |
| 2022/0022237 | A1* | 1/2022 | Kim | H04L 1/1864 |

OTHER PUBLICATIONS

3GPP TS 38.212 V15.4.0 (Dec. 2018); 3rd Generation Partnership Project; Technical Specification Group Radio Access Network; NR; Multiplexing and channel coding (Release 15); Dec. 2018. (Year: 2018).*

3GPP TSG RAN WG1 Meeting #92; R1-1801588; Source: ZTE, Sanechips; Title: Remaining details on SRS; Athens, Greece, Feb. 26-Mar. 2, 2018 (Year: 2018).*

3GPP TSG RAN WG1 Meeting #92; R1-1803410; Source: Sony; Title: Summary of SRS; Athens, Greece, Feb. 26-Mar. 2, 2018 (Year: 2018).*

3GPP TSG RAN WG1 Meeting #92; R1-1801527; Source: vivo; Title: Remaining on SRS design; Athens, Greece, Feb. 26-Mar. 2, 2018. (Year: 2018).*

Huawei., "Considerations for dynamic aperiodic SRS", 3GPP TSG RAN WG1 meeting #62, R1-104302, Aug. 23-27, 2010, 4 Pages, Madrid, Spain.

Catt, "Further discussion on SRS transmission", 3GPP TSG RAN WG1 AH_NR Meeting, R1-1700234, Jan. 16-20, 2017, 5 Pages, Spokane, USA.

"3rd Generation Partnership Project; Technical Specification Group Radio Access Network; NR; Physical channels and modulation (Release 15)", Technical Specification, 3GPP TS 38.211 V15.1.0, Mar. 2018, 90 Pages.

"3rd Generation Partnership Project; Technical Specification Group Radio Access Network; NR; Physical layer procedures for control (Release 15)", Technical Specification, 3GPP TS 38.213 V15.3.0, Sep. 2018, 101 Pages.

"3rd Generation Partnership Project; Technical Specification Group Radio Access Network; NR; Physical layer procedures for data (Release 15)", 3GPP TS 38.214 V15.3.0, Technical Specification, Sep. 2018, 96 Pages.

"3rd Generation Partnership Project; Technical Specification Group Radio Access Network; NR; Radio Resource Control (RRC) protocol specification (Release 15)", Technical Specification, 3GPP TS 38.331 V15.2.1, Jun. 2018, 303 Pages.

Huawei, et al., "Remaining details of SRS design", 3GPP TSG RAN WG1 Meeting #93, R1-1805959, May 21-25, 2018, 5 Pages, Busan, Korea.

ZTE, et al., "MAC CE for activation/deactivation of semi-persistent SRS", 3GPP TSG RAN WG2 Meeting #101, R2-1801932, Feb. 26-Mar. 2, 2018, 6 Pages, Athens, Greece.

3GPP TS 38.212 V15.3.0 (Sep. 2018), 3rd Generation Partnership Project; Technical Specification Group Radio Access Network; NR; Multiplexing and channel coding(Release 15), total 99 pages.

* cited by examiner

101

100

120

120

130

BACKHAUL
NETWORK

110

UPLINK
CONNECTION

DOWNLINK
CONNECTION

200

$\bar{y}^{UE} = Hvs + n$ w

215

$\bar{y}^{AN} = H^{H}ws + n$ v

220

205

210

300
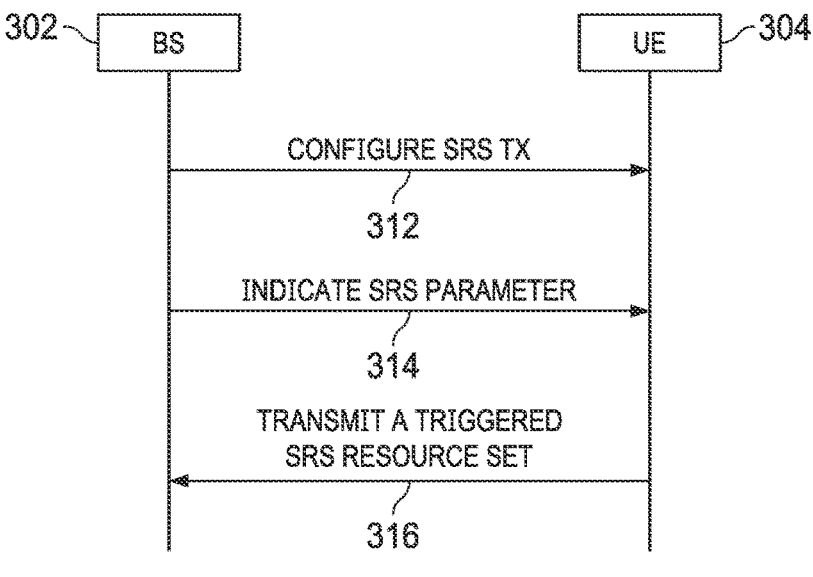
FIG. 3
400
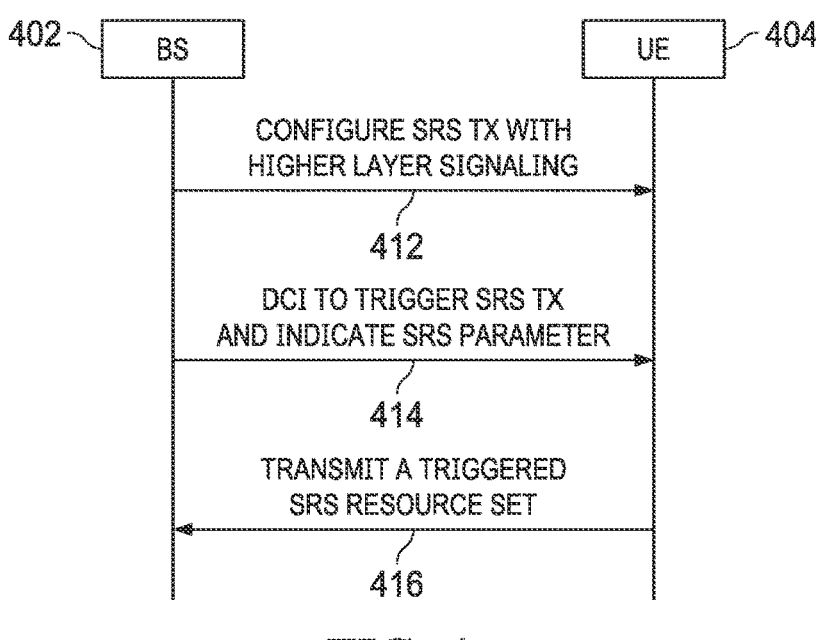
FIG. 4

500

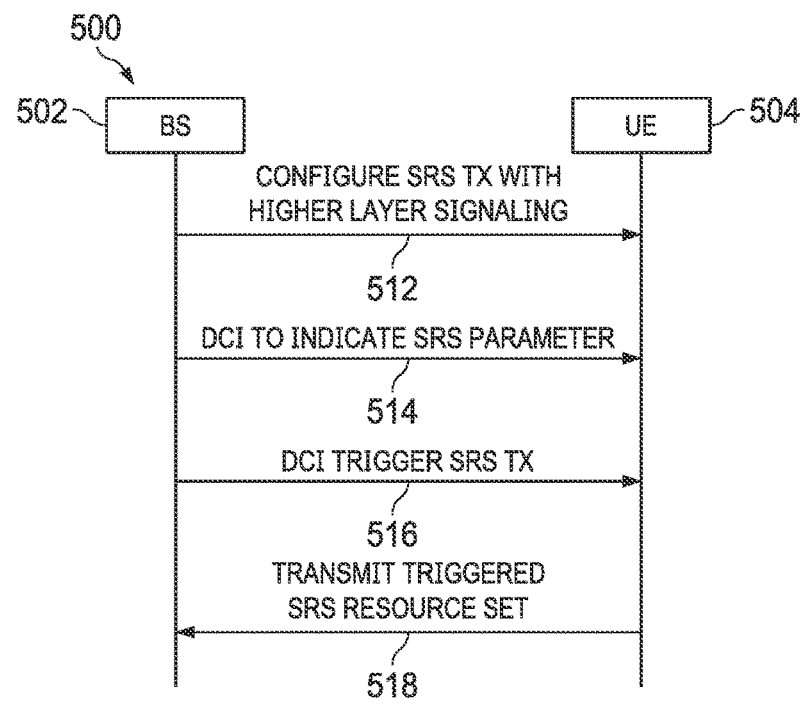

502 — BS          UE — 504

CONFIGURE SRS TX WITH
HIGHER LAYER SIGNALING

512

DCI TO INDICATE SRS PARAMETER

514

DCI TRIGGER SRS TX

516

TRANSMIT TRIGGERED
SRS RESOURCE SET

602 — TRANSMIT, TO A COMMUNICATION DEVICE, A SOUNDING REFERENCE SIGNAL (SRS) CONFIGURATION IN RADIO RESOURCE CONTROL (RRC) SIGNALING, WHERE THE SRS CONFIGURATION INCLUDES A SRS RESOURCE SET AND A SRS BANDWIDTH CONFIGURED FOR TRANSMITTING THE SRS RESOURCE SET

604 — TRANSMIT, TO THE COMMUNICATION DEVICE IN A FIRST MESSAGE AFTER TRANSMITTING THE SRS CONFIGURATION, INFORMATION OF A PORTION OF THE SRS BANDWIDTH FOR USE IN TRANSMISSION OF THE SRS RESOURCE SET

702 — RECEIVE A SOUNDING REFERENCE SIGNAL (SRS) CONFIGURATION IN RADIO RESOURCE CONTROL (RRC) SIGNALING, WHERE THE SRS CONFIGURATION INCLUDES A SRS RESOURCE SET AND A SRS BANDWIDTH CONFIGURED FOR TRANSMITTING THE SRS RESOURCE SET

704 — RECEIVE INFORMATION OF A PORTION OF THE SRS BANDWIDTH FOR USE IN TRANSMISSION OF THE SRS RESOURCE SET

FIG. 7

DEVICE, NETWORK, AND METHOD FOR SOUNDING REFERENCE SIGNAL TRANSMISSION AND RECEPTION

CROSS-REFERENCE TO RELATED APPLICATIONS

This application is a continuation of International Application no. PCT/CN2019/080314, filed on Mar. 29, 2019, which claims priority to U.S. Provisional Application No. 62/800,336, filed on Feb. 1, 2019 entitled "Device, Network, and Method for Sounding Reference Signal Transmission and Reception" which applications are incorporated by reference herein as if reproduced in its entirety.

TECHNICAL FIELD

The present disclosure relates generally to wireless communications, and, in particular embodiments, to a device, network, and method for sounding reference signal (SS) transmission and reception.

BACKGROUND

Sounding reference signals (SRSs) are reference signals transmitted by UEs in the uplink direction. SRSs may be used by base stations to estimate uplink channel quality over a wide bandwidth, and perform communication with UEs based on the uplink channel estimation. For example, a base station may utilize SRSs to perform uplink frequency selective scheduling. A base station may also use SRSs for uplink timing estimation, as part of timing alignment procedure. For example, when there is no physical uplink shared channel (PUSCH) or physical uplink control channel (PUCCH) transmission occurring in the uplink for some time, a base station may rely on SRSs for uplink timing estimation. In a time division duplexing (TDD) communication system, SRSs may also be used for downlink scheduling via exploitation of channel reciprocity.

SUMMARY

In accordance with one aspect of the present disclosure, a method is provide that includes transmitting, by a network controller to a communication device, a sounding reference signal (SRS) configuration in radio resource control (RRC) signaling. The SRS configuration includes a SRS resource set and a SRS bandwidth configured for transmitting the SRS resource set, and the SRS resource set includes a set of SRSs. The method also includes transmitting, by the network controller to the communication device in a first message after transmitting the SRS configuration, information of a portion of the SRS bandwidth for use in transmission of the SRS resource set.

In accordance with another aspect of the present disclosure, a method is provided that includes receiving, by a communication device, a sounding reference signal (SRS) configuration in radio resource control (RRC) signaling. The SRS configuration includes a SRS resource set and a SRS bandwidth configured for transmitting the SRS resource set, where the SRS resource set includes a set of SRSs. The method further incudes receiving, by the UE, a first message comprising information of a portion of the SRS bandwidth for use in transmission of the SRS resource set.

In accordance with other aspects of the present disclosure, an apparatus and a system are also provided for implementing the forgoing methods.

Optionally, in any of the preceding aspects, the SRS bandwidth comprises a set of resource blocks (RBs), and the portion of the SRS bandwidth comprises a subset of the set of RBs.

Optionally, in any of the preceding aspects, the first message is a downlink control information (DCI) message.

Optionally, in any of the preceding aspects, the first message triggers the communication device to transmit the SRS resource set in the portion of the SRS bandwidth.

Optionally, in any of the preceding aspects, the first message is in a group DCI format, and the group DCI format includes a field specifying the portion of the SRS bandwidth.

Optionally, in any of the preceding aspects, the first message is in a DCI format 0_1, with the DCI message being transmitted without scheduling an uplink-shared channel (UL-SCH) or without triggering a channel state information (CSI) request.

Optionally, in any of the preceding aspects, the first message is in a DCI format 1_1, and a frequency domain resource assignment field of the DCI format 1_1 specifies the portion of the SRS bandwidth.

Optionally, in any of the preceding aspects, the first message further includes information of a subset of antenna ports in a set of antenna ports, the set of antenna ports being comprised in the SRS configuration and configured for transmitting the SRS resource set.

Optionally, in any of the preceding aspects, the first message further includes a transmission power control (TPC) command for transmitting the SRS resource set.

Optionally, in any of the preceding aspects, the information of the portion of the SRS bandwidth is transmitted in a medium access control (MAC) control element (CE) comprised in the first message.

Optionally, in any of the preceding aspects, the network controller receives the SRS resource set transmitted by the communication device in the portion of the SRS bandwidth.

Optionally, in any of the preceding aspects, the network controller transmits, to the communication device, a DCI message to trigger the communication device to transmit the SRS resource set in the portion of the SRS bandwidth.

Optionally, in any of the preceding aspects, the communication device transmits the SRS resource set in the portion of the SRS bandwidth.

Optionally, in any of the preceding aspects, the communication device receives a DCI message triggering the communication device to transmit the SRS resource set in the portion of the SRS bandwidth, and transmits the SRS resource set in the portion of the SRS bandwidth upon being trigger by DCI message.

In the forgoing aspects, the network controller transmits information of a portion of a SRS bandwidth to the communication device after the SRS bandwidth is configured for the communication device via RRC signaling. The communication device transmits SRSs in the portion of the SRS bandwidth.

An advantage of the forgoing aspects of the present disclosure is enabling SRS transmissions based on more dynamically determined frequency-domain resources (such as a bandwidth represented by a number of PRBs), and thus providing more flexible SRS transmissions. SRS resource sets transmitted in accordance with dynamically signaled frequency-domain resources more properly reflect the changing and frequency-selective channel conditions, interference situations, precoding, multi-user pairing, frequency-selective scheduling, and other decisions made by base stations or network controllers, for DL and/or UL transmissions, over these frequency-domain resources, and thus may be used to help improve channel estimation.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a diagram of an embodiment method for SRS communication;

FIG. 4 illustrates a diagram of another embodiment method for SRS communication;

FIG. 5 illustrates a diagram of another embodiment method for SRS transmission;

FIG. 6 illustrates a diagram of an embodiment method for wireless communication;

FIG. 7 illustrates a diagram of another embodiment method for wireless communication;

DETAILED DESCRIPTION OF ILLUSTRATIVE EMBODIMENTS

Figure 1:
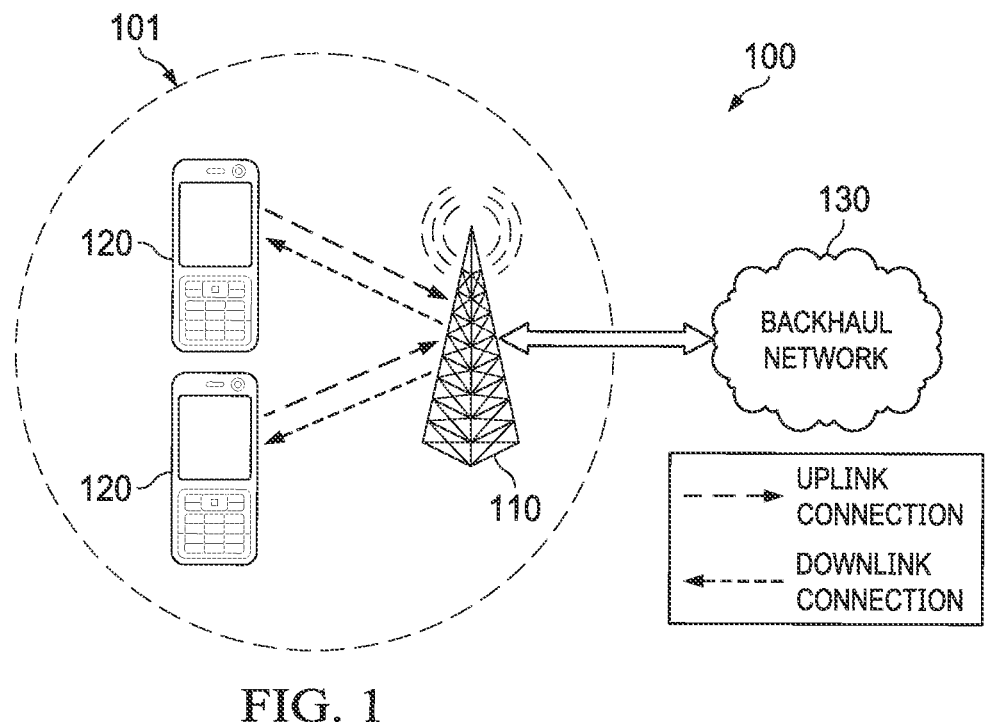
FIG. 1 illustrates a diagram of an embodiment network for wireless communication.

Sounding reference signals (SRSs) are transmitted by communication devices, such as a user equipment (UE), to network devices, such as a base station, for uplink channel estimation. Conventionally, most of the SRS transmission parameters are configured semi-statically by a network device via higher layer signaling. For example, SRS parameters for transmitting a SRS resource set, such as a SRS bandwidth, a number of SRS ports, a SRS resource, a frequency hopping bandwidth, a cyclic shift, and transmission comb, etc., are transmitted semi-statically to a communication device via radio resource control (RRC) signaling. Medium access control (MAC) signaling and physical downlink control information (PHY DCI) signaling may further supply some additional parameters but are mainly limited to the time-domain behavior of SRS (such as an aperiodic SRS request) or power control (such as a transmit power control (TPC) command for SRS).

Embodiments of the present disclosure provide methods for dynamically or semi-persistently adjusting one or more SRS parameters that have been configured via the higher layer signaling. According to some embodiments, a network controller may transmit, to a communication device, information about a portion of SRS frequency-domain resources, e.g., a SRS bandwidth, where the SRS frequency-domain resources have been configured, via RRC signaling, for transmitting a SRS resource set. The communication device may then transmit the SRS resource set in the portion of the SRS bandwidth, e.g., upon being triggered by a downlink control information (DCI) message. After the one or more SRS parameters are adjusted, the communication device transmits SRSs according to the adjusted SRS parameters.

The adjustment of the one or more SRS parameters may be signaled in a DCI message or a medium access control (MAC) control element (CE). For example, the information about the portion of the SRS bandwidth may be transmitted in a DCI message. In other words, the SRS frequency-domain resources may be adjusted in a more flexible fashion. This is different from existing frequency hopping of SRS transmissions, in which a UE follows a pre-determined pattern of frequency-domain resources for SRS transmissions, usually with the same bandwidth. In the embodiments of the present disclosure, the frequency-domain resources for the SRS may be adjusted on demand and more flexibly, and may be further combined with hopping by indicating a portion of the SRS bandwidth that the UE is hopped onto. A new DCI format may be defined for signaling the adjustment. Existing DCI format, such as a group DCI format, a DCI format 0_1, or a DCI format 1_1, may also be used. In each of these cases, the DCI message may include a field containing a SRS parameter that is to be adjusted. Details of the embodiments will be provided in the following description.

The embodiments enable SRS transmissions based on more dynamically determined frequency-domain resources (such as a bandwidth represented by a number of PRBs), and thus provide more flexible SRS transmissions. SRS resource sets transmitted in accordance with dynamically signaled frequency-domain resources more properly reflect the changing and frequency-selective channel conditions, interference situations, precoding, multi-user pairing, frequency-selective scheduling, and other decisions made by base stations or network controllers, for DL and/or UL transmissions, over these frequency-domain resources, and thus may be used to help improve channel estimation.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110, and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB or gNB compliant with various 4G and 5G standards promulgated by 3GPP, and evolutions of such standards), a macro-cell, a femtocell, a Wi-Fi access point (AP), a network controller, or other wirelessly enabled devices. Base stations may provide wireless access in accordance with one or more wireless communication protocols, e.g., long term evolution (LTE), LTE advanced (LTE-A), 3GPP Rel. 15 and subsequent release, High Speed Packet Access (HSPA), Wi-Fi 802.11a/b/g/n/ac, ax and other 802.11xx standards. As used herein, the term "mobile device" refers to any component (or collection of components) capable of establishing a wireless connection with a base station, such as a user equipment (UE), a mobile station (STA), a relay node, an integrated access and backhaul (IAB) node, and other wirelessly enabled devices. In some embodiments, the network 100 may comprise various other wireless devices, such as relays, low power nodes, UE with sidelink (D2D) communications, etc.

In standard antenna element to element channel estimation, a channel between two devices is estimated by having a first device transmit a known signal on a known time or frequency resource (s) to a second device, the received signal at the second device is expressible as $$y = Hs + n$$

where y is the received signal at the second device, s is the known signal (which may be a reference signal, a pilot, or a pilot signal), H is the channel model or response, and n is the noise (and interference for some communication channels). Because s is known by the second device, it is possible for the second device to determine or estimate H from y.

Figure 2:
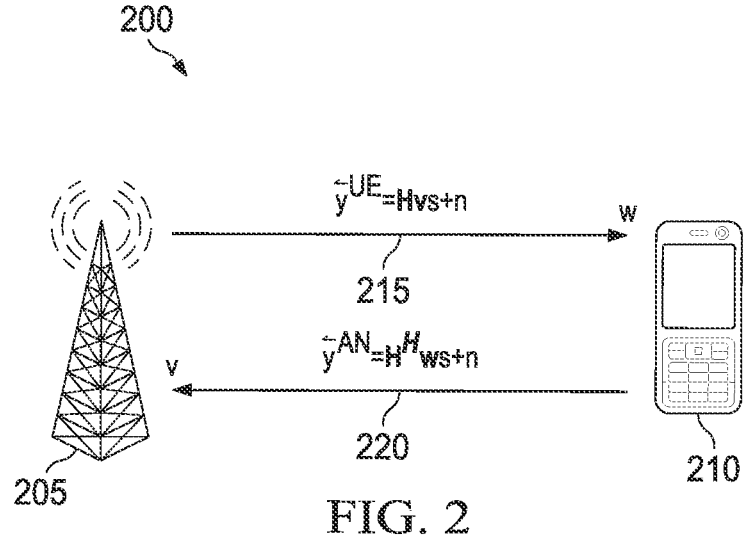
FIG. 2 illustrates a diagram of an embodiment communications system.

FIG. 2 illustrates an example communications system 200, providing mathematical expressions of signals transmitted in the communications system. The communications system 200 includes an access node (AN), e.g., a base station, 205, communicating with a UE 210. As shown in FIG. 2, the base station 205 is using a spatial transmit filter v and the UE 210 is using a spatial receive filter w. Transmissions from the base station 205 may be precoded using the transmit filter v on the multiple transmit antennas of the base station. Similarly, transmissions from the UE 210 may be precoded using the transmit filter w on the multiple transmit antennas of the UE. The downlink channel and uplink channel between the base station 205 and the UE 210 may be modeled as H and H" (which is the Hermitian of channel model H), respectively. The filter v or w may be referred to as a precoder. As shown, the base station 205 precodes a downlink signal s with the transmit filter v and sends the precoded downlink signal to the UE 210. The signal received by the UE 210 is expressible as $\vec{y}^{UE}$=Hvs+n. Similarly, the UE 210 precodes an uplink signal s with the transmit filter w and sends the precoded uplink signal to the base station 205. The signal received by the base station 205 is expressible as $\bar{y}^{AN}$ =$H^{H}$ws+n.

The UE 210 may send sounding reference signals (SRS) (i.e., the uplink signal s is a SRS transmitted by the UE 210) to the base station 205 for the base station to estimate the uplink channel, i.e., $H^{H}$. SRSs are signals known at a base station and are transmitted by a UE using time/frequency transmission resources specified by the base station. SRSs may convey interference situations in neighboring cells of a UE accounting the UEs' interference suppression receiver capability by applying receiving filter for downlink signals as transmitting filter of the SRSs. A base station may analyze received SRS transmission(s) to estimate the uplink channel over a wide bandwidth, and perform communication with the UE based on the uplink channel estimation. This helps improve performance of communication between the UE sending SRS and the base station. The base station may utilize the SRSs for uplink frequency selective scheduling, uplink timing estimation, and even downlink scheduling if channel reciprocity is exploited.

Conventionally, a base station semi-statically configures transmission of SRSs for UEs using higher layer signaling, e.g., radio resource control (RRC) signaling. According to 3GPP TS 38.214 V15.3.0 (2018-09), a UE may be configured with one or more SRS resource sets by a higher layer parameter SRS-ResourceSet. For aperiodic SRS, at least one state of a DCI field is used to select at least one out of the configured SRS resource set(s). For each SRS resource set, a UE may be configured with K≥1 SRS resources (by a higher layer parameter SRS-Resource), where the maximum value of K is indicated by a parameter SRS_capability. A SRS resource set is generally referred to as a set of SRS resources. A SRS resource is generally referred to as a SRS signal. The SRS resources in different SRS resource sets can be transmitted simultaneously. Each SRS resource set is associated with a set of SRS parameters, according to which SRS signals in the SRS resource set are transmitted.

According to 3GPP TS 38.24V15.3.0 (2018-09), SRS parameters semi-statically configurable by higher layer parameter SRS-Resource include, for example, a srs-ResourceId that determines a SRS resource configuration identify, a number of SRS ports, time domain behavior of SRS resource configuration (e.g., periodic, semi-persistent, aperiodic SRS transmission), slot level periodicity and slot level offset, the number of orthogonal frequency division multiplex (OFDM) symbols in a SRS resource, SRS bandwidth via parameters $B_{SRS}$ and $C_{SRS}$ (see also IS 38.211 for details), frequency hopping bandwidth $b_{hop}$, cyclic shift, transmission comb, transmission comb offset, SRS sequence ID, and configuration of spatial relation between a reference RS (e.g., an SS/PBCH block, CSI-RS or an SRS configured on the same or different component carrier and/or bandwidth part as the target SRS) and a target SRS. The SRS parameters may be signaled semi-statically to UEs for SRS transmission.

A UE may perform SRS transmission periodically, or aperiodically upon being triggered by a base station using a downlink control information (DCI) message. For example, after a UE is configured, semi-statically using higher layer signaling, with one or more SRS resource sets, a DCI message may be sent to the UE to trigger the UE to transmit a triggered SRS resource set (or more generally one or more triggered SRS signal(s)) that has been configured using higher layer signaling. Conventionally, DCI messages in a DCI format 0_1 (for PUSCH scheduling), a DCI format 1_1 (for PDSCH scheduling), and a DCI format 2_3 (for group SRS power control and triggering) are used for triggering SRS transmission. According to 3GPP TS 38.212 V15.3.0 (2018-09), a DCI message used to trigger SRS transmission includes a SRS request field, which may have 2 bits, for triggering one of multiple pre-configured SRS resource sets to be transmitted.

The conventional SRS transmission scheme semi-statically configures SRS parameters, e.g., transmission bandwidth (with or without frequency hopping), transmission ports, etc., and provides wideband precoding (where a same spatial filter is applied on multiple transmit antennas across the whole transmission bandwidth of a SRS signal). However, in many cases, a base station may receive SRSs as interference from transmissions by other UEs in a network, e.g., in the same cell or a neighboring cell. Furthermore, channel conditions may vary in time, e.g., due to movement of UEs. To more accurately reflect the interference situation, the varying channel conditions and UE receiver precoding, dynamically measuring uplink channels based on dynamically adjusted SRS parameters may be more desirable than the conventional SRS transmission scheme. Furthermore, in the case of channel reciprocity, a base station may derive (or predict) the downlink interference situation at the UEs based on the received SRS signals if these SRS signals are transmitted in the manner that reflects the needed conditions for transmitter side operations, such as dynamic scheduling, resource allocation, precoding, and etc. For example, a base station may request a UE to transmit SRSs according to SRS parameters that are dynamically adjusted or indicated by the base station. The dynamically indicated SRS parameters may be determined based on its interest of estimation, such as a particular subband, a particular antenna port, or transmission power. In addition, SRS transmission bandwidth may need to be adjusted and indicated dynamically for physical downlink shared channel (PDSCH) transmission in a frequency division multiplexing (FDM) communication system in order to properly reflect the downlink interference situation.

Embodiments of the present disclosure provide methods for dynamically or semi-persistently signaling information for SRS transmission. Signaling of the information for SRS transmission instructs a UE to transmit SRSs according to the signaled information, instead of the semi-dynamically configured SRS parameters. In this way, the embodiment methods adjust SRS parameters to be used by the UE for SRS transmission. The embodiment methods enable flexible SRS transmissions based on the dynamically or semi-persistently signaled SRS parameters. SRS resources transmitted based on such signaled SRS parameters may reflect channel interference situations, channel conditions and precoding more properly and timely, and thus improve channel estimation performance.

The dynamically signaled information may include information about one or more SRS parameters, such as a SRS bandwidth, antenna ports, frequency hopping, antenna or carrier switching within a signaled SRS bandwidth, SRS resources to be transmitted, precoding based on measurements of downlink signal and interference, SRS transmission power within a signaled SRS bandwidth, related RRC configuration, or any other information for SRS transmission. The information about the antenna ports may specify a number (quantity) of the antenna ports, or a subset of the configured antenna ports, e.g., in terms of resource mapping and multiplexing. For example, ports mapped to SRS resources to be transmitted may be signaled or indicated. A mapping between the dynamically signaled SRS ports and the SRS resources (including RE/sequences, CS/comb mapping) may be predefined. Downlink (DL) reference signal (RS) ports corresponding to the signaled ports may also be signaled for the UE to perform measurements to derive precoding for transmission of a SRS on the signaled ports. The information dynamically signaled may also be generally referred to as SRS parameters in the following description. The terms of "antenna port" and "port" are used interchangeably in the disclosure.

FIG. 3 illustrates a diagram of an embodiment method 300 for SRS communication. In this example, a base station 302 semi-statically configures SRS transmission for a UE 304 and dynamically indicates SRS parameters to the UE 304, and the UE 304 transmits SRSs based on the configuration and indication. At step 312, the base station 302 semi-statically configures the UE 304 for SRS transmission. For example, the base station 302 may semi-statically configure, for the UE 304, multiple SRS resource sets, e.g., per bandwidth part (BWP), associated with different set of SRS parameters, including e.g., SRS bandwidth, numbers of port, cyclic shift, transmission comb, or other SRS parameters as specified by 3GPP TS 38.214 V15.3.0 (2018-09). For each of the multiple SRS resource sets, a DL channel state information-reference signal (CSI-RS) resource (together with a corresponding bandwidth and number of ports) may be configured for spatial relation with a corresponding SRS resource set, in order to derive proper precoding (e.g., the transmit filterer w as illustrated in FIG. 2) at the UE 304. The base station 302 may semi-statically configure one or more SRS resource sets for the UE 304. For example, the base station 302 may semi-statically signal SRS parameters associated with each SRS resource set to the UE 304 using RRC signaling. One of the SRS resource sets may be selected and triggered by the base station 302, which will be sent by the UE 304.

After step 312, the base station 302 may, at step 314, dynamically indicate or signal one or more SRS parameters to the UE 304. For illustration simplicity, a SRS parameter configured at step 312 may be generally referred to as a configured SRS parameter, and a SRS parameter signaled at step 314 may be generally referred to as an indicated SRS parameter. By use of step 314, the base station 302 further requests that the UE 304 transmits a triggered SRS resource set based on the SRS parameters specifically indicated or signaled at step 314. The one or more SRS parameters may include a SRS transmission bandwidth which may be a subset of a configured SRS bandwidth of the triggered SRS resource set. For example, a subset of resource blocks (RBs, or physical RBs (PRBs)), in a set of RBs that has been configured semi-dynamically (e.g., at step 312) using higher layer signaling (via the parameters of SRS bandwidth configuration C_SRS and SRS bandwidth B_SRS), may be dynamically indicated by the base station 302 to the UE 304. Although the descriptions are mainly based on RBs, the same may be done for subbands, RB groups (RBGs), sub-channels, frequency-domain bundles, or other types of frequency units. The one or more SRS parameters may include antenna ports, which may be a subset of ports in a set of ports that has been configured semi-dynamically using higher layer signaling (e.g., at step 312). For example, the semi-statically configured antenna ports include ports 1-4, and a subset of the ports 1-4, e.g., port 1 and port 3, may be dynamically signaled for the UE 304 to transmit SRSs using port 1 and port 3.

The base station may dynamically signal the one or more SRS parameters at step 314 using a DCI message, a medium access control (MAC) control element (CE), or other applicable control messages. In one example, a new DCI format dedicated for dynamically or semi-persistently signaling SRS parameters and triggering SRS transmission may be defined. The new DCI format may also include a field for CSI-RS triggering. In another example, DCI formats used for PDSCH or PUSCH scheduling, or the group DCI format may be modified and used for dynamically signaling SRS parameters. In this case, the resource assignment filed of a DCI format may be used to dynamically indicate a SRS bandwidth to be used for SRS transmission. In another example, a new MAC CE may be defined to include one or more SRS parameters to be dynamically indicated.

At step 316, the UE 304 may, based on the semi-dynamic SRS configuration (at step 312) and the dynamic indication (at step 314), transmit a triggered SRS resource set. One of the SRS resource sets configured at step 312 may be selected and triggered by the base station 302 to be transmitted by the UE 304. In one embodiment, a DCI message may be used to signal the one or more SRS parameters at step 314 and also trigger the UE 304 to transmit a SRS resource set (i.e., a triggered SRS resource set) as configured at step 312. As an illustrative example, the triggered SRS resource set is associated with a RB set (including a set of RBs) as SRS bandwidth and a port set (including a set of ports) as SRS antenna ports, over which SRSs are to be transmitted, and the DCI message sent at step 314 includes a subset of RBs in the RB set and a subset of ports in the port set. In this case, the UE 304 may transmit the triggered SRS resource set according to the subset of RBs and the subset of ports. Other SRS parameters, such as transmission comb, transmission comb offset, SRS sequence ID, etc., associated with the triggered SRS resource set and have been configured at step 312, may still be used by the UE 304 in transmitting the triggered SRS resource set, if they are not changed or adjusted by the base station 302 using any signaling. The dynamic signaling of the SRS parameters, in this case, may be viewed as to adjust or change values of the similar SRS parameters that have previously been configured semi-dynamically, and the adjusted values will be used for SRS transmission by the UE 304.

The UE 304 may derive the precoder for transmitting the triggered SRS resource set based on one or more DL RS resource(s) (i.e., DL RS signal(s)) that are configured for channel and interference measurements of an indicated SRS transmission bandwidth, which may be a subband of a transmission bandwidth between the UE 304 and the base station 302, or the entire transmission bandwidth. For example, a subband precoding for SRS transmission in the subband may be applied when a precoder of the subband can be derived based on a DL RS resource that is configured for channel and for interference measurements of the subband. In another example, wideband precoding for SRS transmission in the entire transmission bandwidth may be applied when a wideband precoder can be derived based on a DL RS resource configured for channel and for interference measurements of the transmission bandwidth. The transmission bandwidth between the UE 304 and the base station 302 may be semi-statically configured by the base station, and the subband may by dynamically indicated by the base station to the UE. The UE derives the precoder for the indicated subband, precodes a SRS with the precoder, and sends the precoded SRS. When no subband is indicated by the base station 302 dynamically, the UE 304 will derive a wideband precoder to precode the SRS and sends the precoded SRS. In any of the cases where subband precoding or wideband precoding is used, the number of transmission layers, and/or transmission ports may also be indicated, e.g., using DCI or MAC CE, or configured using RRC, by base station 302 to the UE 304. The UE 304 may derive a transmission power for SRSs according to the dynamically indicated SRS transmission bandwidth instead of the semi-statically configured SRS transmission bandwidth.

A DCI message may be sent before step 314 and after step 312 to trigger the UE 304 to transmit a SRS resource set (i.e., a trigger SRS resource set). In this case, the UE 304, upon receipt of the DCI message, may transmit the SRS resource set according to SRS parameters associated with the triggered SRS resource set that has been configured by the base station at step 312, such as the RB set and the port set.

According to some embodiments, after the UE receives a message to overwrite certain SRS configurations configured by a previous RRC signaling, the UE will use the new SRS configurations/parameters according to the message from now on, until it receives another RRC signaling or another message to further overwrite the SRS configurations/parameters. In other words, the configurations/parameters in the message apply until further changed. According to some other embodiments, after the UE receives a message to overwrite certain SRS configurations configured by a previous RRC signaling, the UE will use the new SRS configurations/parameters according to the message for one transmission, and after that, it reverts to the "normal state" of SRS configurations/parameters in accordance with the original RRC signaling. In other words, the configurations/parameters in the message apply for one shot only. According to some other embodiments, after the UE receives a message to overwrite certain SRS configurations configured by a previous RRC signaling, the UE will use the new SRS configurations/parameters according to the message for n transmissions or m slots, and after that it reverts to the "normal state" of SRS configurations/parameters in accordance with the original RRC signaling. Here, the n transmissions or m slots may be specified by a standard specification, in a RRC configuration signaling, in a MAC signaling, a DCI, or in general a message (or the message). In yet some other embodiments, the message includes a bit to indicate if the new SRS configurations/parameters in the message are for one-shot use and revert or for use from now on.

According to some embodiments, a new DCI format may be defined, which may be dedicated for dynamically signaling SRS parameters and/or triggering SRS transmission. The new DCI format may include fields to indicate a SRS transmission bandwidth (which may include a subset of a bandwidth that has been configured using higher layer signaling), SRS transmission ports (which may include a subset of ports that have been configured using higher layer signaling), SRS transmission power, or other SRS parameters that may be dynamically signaled to UEs for SRS transmission. Table 1 below shows an example of the new DCI format including a portion of fields it may have. Fields for dynamically indicating other SRS parameter, such as cyclic shift, SRS sequence Id, etc., may also be added

TABLE 1

| Field |
| --- |
| SRS request |
| Frequency domain resource assignment |
| Antenna ports |
| TPC command |

Table 1 shows four fields including "SRS request", "frequency domain resource assignment", "antenna ports" and "TPC command". The "SRS request" field is used to trigger transmission of a SRS resource set. This field may have various lengths, e.g., 1 bit or 2 bits. Accordingly, different number of SRS resource sets may be selected and triggered via this field. The "frequency domain resource assignment" field may be defined similarly to the "frequency domain resource assignment" field used for PUSCH/PDSCH frequency domain resource assignment in existing DCI format, as specified by 3GPP TS 38.211 V15.3.0 (2018-09). However, the frequency domain resource specified by this field needs to fall within a SRS bandwidth configured using higher layer signaling for SRS resource set(s). For example, this field may specify a subset of a SRS bandwidth that has been configured using higher layer signaling for a SRS resource set. The "antenna ports" field may be used to specify antenna ports for SRS transmission (as well as the DL RS ports for deriving a SRS precoder). For each SRS port, there may be a DL RS port configured for a UE to derive SRS port precoding. In such a case, the DL RS port is associated with the SRS port, and may be indicated in the same field as the SRS port. The "antenna ports" field may specify a subset of the ports semi-statically configured using higher layer signaling. The "TPC command" field may specify a transmit power control command, based on which SRS transmission power may be adjusted.

To differentiate this new DCI format from other DCI formats, a new radio network temporary identifier (RNTI) may be configured for the new DC format. The new DCI format may have cyclic redundancy check (CRC) scrambled by the new RNTI. A UE may recognize the new DCI format by use of the new RNTI.

In one example, this new DCI format may be used to dynamically trigger SRS transmission while indicating a SRS transmission bandwidth and ports. In another example, the new DCI format may be used only for semi-persistently adjusting a SRS transmission bandwidth and ports without triggering the SRS transmission. In this case, a different DCI format may then be used (e.g., transmitted after the semi-persistent adjustment) to dynamically trigger the SRS transmission without further changing the SRS transmission bandwidth and ports. In yet another example, the new DCI format may be used for semi-persistently adjusting a SRS transmission bandwidth and ports while triggering the SRS transmission. In this case, a different DCI format may also be used (e.g., transmitted after the new DC format message is sent for semi-persistent adjustment) to dynamically trigger the SRS transmission without adjusting the SRS transmission bandwidth and ports but applying the adjusted transmission bandwidth and ports.

According to some embodiments, the existing DCI format 2_3, for transmission of a group of TPC commands for SRS transmissions by one or more UEs as specified by 3GPP TS 38.212 V15.3.0 (2018-09), or variations of the DCI format 2_3, may be modified for dynamically indicating SRS parameters to UEs. The existing DCI format 2_3 includes a SRS request field and a TPC command field for each block, as specified by 3GPP TS 38.212 V15.3.0 (2018-09).

In one embodiment, for each SRS request block of the DCI format 2_3, field(s) may be added to indicate its corresponding SRS transmission bandwidth (which includes a subset of a bandwidth configured using higher layer signaling), SRS transmission ports (which include a subset of configured ports using higher layer signaling), or other SRS parameters that may be dynamically adjusted. Table 2 below shows an example of the modified DCI format 2_3 including a portion of fields it may have for one SRS request block.

TABLE 2

| Field |
| --- |
| SRS request |
| Frequency domain resource assignment |
| Antenna ports |
| TPC command |

Table 2 shows four fields including "SRS request", "frequency domain resource assignment", "antenna ports" and "TPC command". Table 2 is similar to Table 1. However, the fields of "frequency domain resource assignment" and "antenna ports" are added to the DCI format 2_3. The "SRS request" field is similar as that of the DCI format 2_3 TypeB, and has the same value, i.e., 0 or 2 bits. It is used to trigger transmission of a SRS resource set. More than 2 bits may be used to trigger transmission of a SRS resource set selected from a large number of SRS resource sets. The "frequency domain resource assignment" field is added, and may be defined similarly to the "frequency domain resource assignment" field used for PUSCH/PDSCH frequency domain resource assignment in existing DCI format, as specified by 3GPP TS 38.211 V15.3.0 (2018-09). However, the frequency domain resource assignment by this field needs to fall within the bandwidth configured using higher layer signaling for SRS resource set(s). The "antenna ports" field is added and used to specify antenna ports for SRS transmission (as well as the DL RS ports for deriving a SRS precoder). The "antenna ports" field may specify a subset of the ports that have been semi-statically configured using higher layer signaling. The "TPC command" field is the same as that of the DCI format 2_3 TypeB. It includes a transmit power control command, based on which transmit power for transmitting a triggered SRS resource set may be adjusted. Table 2 shows that the "frequency domain resource assignment" and the "antenna ports" are two separate fields. In another embodiment, one single field may be defined and added in the DCI format 2_3 to jointly specify the "frequency domain resource assignment" and the "antenna ports".

The DCI format 2_23 is associated with two types, i.e., typeA and typeB, configured with a higher layer parameter srs-TPC-PDCCH-Group, as specified by 3GPP TS 38.211V15-3-o (2018-09). To differentiate from the DCI format 2_23 with typeA and typeB, a new typeC may be defined and a UE may be configured with the higher layer parameter srs-TPC-PDCCH-Group=typeC. When the UE is configured with typeC, the "SRS request", "frequency domain resource assignment", "antenna ports" and "TPC command" fields in the modified DCI format 223 specify the corresponding SRS parameters for the UE to perform SRS transmission.

The modified DCI format 2_3 may be used for adjusting SRS parameters and/or triggering SRS transmission dynamically. In one example, the modified DCI format 2_3 may be used to dynamically trigger SRS transmission while indicating SRS transmission bandwidth and ports. In another example, the modified DCI format 2_3 may be used for semi-persistently adjusting SRS transmission bandwidth and ports for SRS transmission without triggering the SRS transmission. In this case, a different DCI format may then be used to dynamically trigger the SRS transmission without further changing the SRS transmission bandwidth and ports. In yet another example, the modified DCI format 223 may be used for semi-persistently adjusting a SRS transmission bandwidth and ports while triggering the SRS transmission. In this case, a different DCI format may also be used (e.g., transmitted after the DCI format 223 message is sent) to dynamically trigger the SRS transmission without adjusting the SRS transmission bandwidth and ports but applying the adjusted transmission bandwidth and ports.

According to some embodiments, the DCI format 0_1 for scheduling of PUSCH in one cell, as specified by 3GPP TS 38.212 V15.3.0 (2018-09), may be reused for dynamically adjusting SRS parameters. The DCI format 0_1 includes a "SRS request" field, a "frequency domain resource assignment" field, a "TPC command field", an "antenna ports" field, a "UL/SUL indicator" field, and a "CSI request" field, as specified by 3GPP TS 38.212 V15.3.0 (2018-09).

Some fields, such as the "frequency domain resource assignment", "antenna ports" and "TPC command", in the DCI format 0_1 may be used to indicate SRS parameters, when the DCI format 0_1 triggers a SRS transmission with the "SRS request" field without scheduling an uplink-shared channel (UL-SCH) or triggering a CSI request. In this case, the field of "UL-SCH indicator" has a value of "o", which means that no UL-SCH is transmitted on a PUSCH, and the "CSI request indicator" has a value of "o", which means that a CSI request is not triggered and no CSI is transmitted on a PUSCH.

When the SRS transmission is triggered without the UL-SCH or CSI transmission being triggered, the "frequency domain resource assignment" field indicates a subset of the SRS bandwidth that has been configured using higher layer signaling, the "antenna ports" field indicates a subset of the ports that have been configured using higher layer signaling, and the "TPC command" field indicates a power control command based on which transmit power for transmitting a triggered SRS resource set may be adjusted. In this case, the "frequency domain resource assignment" field may be defined similarly to the "frequency domain resource assignment" field used for PUSCH/PDSCH frequency domain resource assignment in existing DCI format, as specified by 3GPP TS 38.212 V15.3.0 (2018-09). However, the frequency domain resource specified by this field needs to fall within the SRS bandwidth configured using higher layer signaling for SRS resource set(s). The "antenna ports" field specifies antenna ports for SRS transmission (as well as the DL RS ports for deriving a SRS precoder). The "antenna ports" field may specify a subset of the ports semi-statically configured using higher layer signaling. The "TPC command" field is the same as that of the DCI format 0_i, but it specifies a transmit power control command for adjusting transmission power of a triggered SRS resource set.

When the "UL-SCH indicator" has a value "1", or the CSI request is triggered, a UL-SCH or CSI will be transmitted on a PUSCH, and the field for frequency domain resource assignment specifies frequency resource assignment information for the PUSCH, instead of SRS transmission. In this case, when the "SRS request" field triggers transmission of a SRS resource set, the transmission will be performed using SRS parameters, such as SRS bandwidth and ports, that have most recently been configured (e.g., by RRC signaling) or indicated or adjusted (e.g., by DCI or MAC CE). As an illustrative example, a base station configures multiple SRS resource sets for a UE, each SRS resource set associated with a set of SRS parameters. For example, the base station configures a set of RBs (as a SRS bandwidth) and antenna ports for an associated SRS resource set. The base station then sends the DCI format 0_1 to trigger transmission of a SRS resource set and to trigger transmission of CSI. The base station does not adjust any SRS parameter before the DCI format 0_1 is sent. In this case, the triggered SRS resource set will be transmitted in accordance with the associated SRS parameters (i.e., the set of RBs and the antenna ports) of the triggered SRS resource set. However, if the base station sends, before the DCI format 0_i triggers the transmission of the SRS resource set, a DCI message, e.g., in a new DCI format as described in Table 1, to adjust one or more SRS parameters in the set of SRS parameters associated with the triggered SRS resource set, the triggered SRS resource set will be transmitted in accordance with the adjusted SRS parameters, which have most recently been adjusted.

According to some embodiments, the DCI format 1_1 for scheduling of PDSCH in one cell, as specified by 3GPP TS 38.212 V15.3.0 (2018-09), may be reused for dynamically triggering SRS transmission and/or adjusting SRS parameters. The DCI format 1_1 includes a "SRS request" field, a "frequency domain resource assignment" field, and an "antenna ports" field, as specified by 3GPP TS 38.212 V15.3.0 (2018-09). The "frequency domain resource assignment" field, and the "antenna ports" field are used to specify frequency resource assignment (i.e., DL transmission bandwidth) and antenna ports for PDSCH transmission, respectively.

In one embodiment, when the "SRS request" field triggers a SRS transmission of a SRS resource set, the transmission may be performed using SRS parameters, such as SRS bandwidth and ports, that have most recently been configured or indicated (or adjusted), similar to what has been discussed above with respect to the DCI format 0_i reused for SRS transmission. For example, the SRS resource set may be transmitted according to a set of SRS parameters associated with the SRS resource set that has been configured using higher layer signaling, if none of the set of SRS parameters has been adjusted before triggering the SRS transmission. If one or more SRS parameters have been adjusted, e.g., by a DCI message or a MAC CE, before triggering the SRS transmission by the DCI format 1_1, the SRS resource set may be transmitted according to the adjusted SRS parameters.

In another embodiment, the "frequency domain resource assignment" field, and the "antenna ports" field of the DCI format 1_1 may be used to indicate transmission bandwidth and ports for both PDSCH transmission and triggered SRS transmission. When the two fields are used for SRS transmission, the "frequency domain resource assignment" field may be defined similarly to the "frequency domain resource assignment" field used for PUSCH/PDSCH frequency domain resource assignment in an existing DCI format, as specified by 3GPP TS 38.212 V15.3.0 (2018-09). However, the frequency domain resource specified by this field needs to fall within the SRS bandwidth that has been configured using higher layer signaling for a triggered SRS resource set. The "antenna ports" field specifies antenna ports for SRS transmission as well as DL RS ports for deriving a SRS precoder. The antenna ports specified may include a subset of the ports that have been configured using higher layer signaling for a triggered SRS resource set.

In this case, an indication may be used to indicate whether the "frequency domain resource assignment" field and the "antenna ports" field in the DCI format 1_1 are used for PDSCH transmission or for SRS transmission. The indication may be included in the DCI format 1_1 which triggers the SRS transmission or the PDSCH transmission. The indication may also be indicated using RRC signaling, a MAC CE or a different DCI message, which may be sent before the DCI format 1_1 is sent to trigger the SRS transmission or the PDSCH transmission. The indication may be a i-bit value, e.g., "o" or "1", indicating PDSCH transmission or SRS transmission.

According to some embodiments, a new MAC CE may be defined and used for semi-persistently or dynamically indicating and adjusting SRS parameters, such as SRS transmission bandwidth and ports for SRS transmission, after SRS resource sets have been configured for UEs using higher layer signaling. The new MAC CE may include fields indicating one or more SRS parameters. For example, the new MAC CE may include a "frequency domain resource assignment" field, an "antenna ports" field and a "TPC command" field. The "frequency domain resource assignment" field may have values similar to the "frequency domain resource assignment" field used for PUSCH/PDSCH frequency domain resource assignment in existing DCI format, as specified by 3GPP TS 38.212 V15.3.0 (2018-09). However, the frequency domain resource specified by this field needs to fall within the SRS bandwidth configured using higher layer signaling for SRS resource set(s). For example, the frequency domain resource may include a subset (e.g., a subset of RBs) of the configured SRS bandwidth. The "antenna ports" field may be used to specify antenna ports for SRS transmission (as well as the DL RS ports for deriving a SRS precoder). The antenna ports specified may include a subset of the ports that have been configured using higher layer signaling. The "TPC command" may include a transmit power control command, based on which transmit power for SRS transmission may be adjusted.

After the MAC CE is sent to a UE, which adjusts one or more SRS parameters, a DCI message may be sent to the UE to trigger transmission of a SRS resource set without changing any SRS parameters. Upon being triggered, the UE may transmit the triggered SRS set based on the MAC CE and the higher layer SRS configuration, i.e., according to the one or more SRS parameters indicated by the MAC CE and other configured SRS parameters that have not been adjusted by the MAC CE.

FIG. 4 illustrates a diagram of another embodiment method 400 for SRS transmission. In this example, a base station 402 semi-statically configures SRS transmission for a UE 404 and dynamically adjusts one or more SRS parameter that have been configured, and the UE 404 transmit a SRS according to the configured and adjusted SRS parameters. As shown, at step 412, the base station 402 configures SRS transmission for the UE 404 using higher layer signaling. For example, the base station 402 may signal configuration of one or more SRS resource sets using RRC signaling, and each of the one or more SRS resource sets is associated with a set of SRS parameters, according to which a SRS resource may be transmitted. At step 414, the base station 402 triggers transmission of a SRS resource set that has been configured at step 412, and also indicates one or more SRS parameters to the UE 404. By indicating the one or more SRS parameters, the base station 402 adjusts the configured SRS parameters associated with the triggered SRS resource set. For example, the base station 402 may transmit SRS parameters, such as a SRS transmission bandwidth, antenna ports, a TPC command, etc., to the UE 404 at step 414. Step 414 may be performed using a DCI message. The DCI message may have a new DCI format including fields specifying the one or more SRS parameters, a modified DCI format 2_3, a DCI format 0_1 or a DCI format 1_1, as described above. At step 416, the UE 404, upon being trigger by the DCI message sent at step 414, transmits the triggered SRS resource set to the base station 402 according to the adjusted SRS parameters.

FIG. 5 illustrates a diagram of another embodiment method 500 for SRS transmission. In this example, a base station 502 semi-statically configures SRS transmission for a UE 504 and dynamically adjusts one or more SRS parameters that have been configured. The base station 504 then triggers the UE 504 for SRS transmission, and the UE 504 transmits a SRS according to the configured and adjusted SRS parameters. As shown, at step 512, the base station 502 configures SRS transmission for the UE 504 using higher layer signaling. For example, the base station 502 may signal configuration of one or more SRS resource sets using RRC signaling, and each of the one or more SRS resource sets is associated with a set of SRS parameters, according to which a SRS resource may be transmitted. At step 514, the base station 502 adjusts one or more SRS parameters associated with a SRS resource set. For example, the base station 502 may transmit the one or more adjusted SRS parameters, such as a SRS transmission bandwidth, antenna ports, a TPC command, etc., to the UE 504. FIG. 5 shows that a DCI is sent at step 514 to indicate the SRS parameters. Step 514 may also be performed using a MAC CE. As described above, the DCI message may have a new DCI format including fields specifying the one or more SRS parameters, or a modified DCI format 2-3. At step 516, the base station 502 sends a DCI message to the UE 504 to trigger transmission of a SRS resource set. The DCI message may have a format of DCI format 0_1, or DCI format 1_1, or other DCI format that is conventionally used for triggering SRS transmission. At step 518, the UE 504, upon being triggered by the DCI message sent at step 516, transmits the triggered SRS resource set to the base station 402 according to the adjusted SRS parameters.

FIG. 6 illustrates a diagram of an embodiment method 600 for wireless communication. The method 600 may be performed by a network controller, such as an access node, or a base station. At step 602, the network controller transmits, to a communication device, a sounding reference signal (SRS) configuration in radio resource control (RRC) signaling, where the SRS configuration includes a SRS resource set and a SRS bandwidth configured for transmitting the SRS resource set. The SRS resource set includes a set of SRSs. At step 604, the network controller transmits, to the communication device in a first message after transmitting the SRS configuration, information of a portion of the SRS bandwidth for use in transmission of the SRS resource set. The network controller may then receive the SRS resource set that is transmitted by the communication device in the portion of the SRS bandwidth. The portion of the SRS bandwidth is within the bandwidth that the communication device hops onto, if frequency hopping applies to the transmission of the SRS resource set. That is, the portion of the SRS bandwidth is defined with respect to the bandwidth or frequency resources that the communication device is supposed to use if no adjustment is signaled.

FIG. 7 illustrates a diagram of another embodiment method 700 for wireless communication. The method 700 may be performed by a communication device, such as a UE. At step 702, the communication device receives a sounding reference signal (SRS) configuration in radio resource control (RRC) signaling, where the SRS configuration includes a SRS resource set and a SRS bandwidth configured for transmitting the SRS resource set. The SRS resource set includes a set of SRSs. At step 704, the communication device receives information of a portion of the SRS bandwidth for use in transmission of the SRS resource set. The communication device may then transmit, e.g., upon being triggered by a DCI message, the SRS resource set in the portion of the SRS bandwidth.

Figure 8:
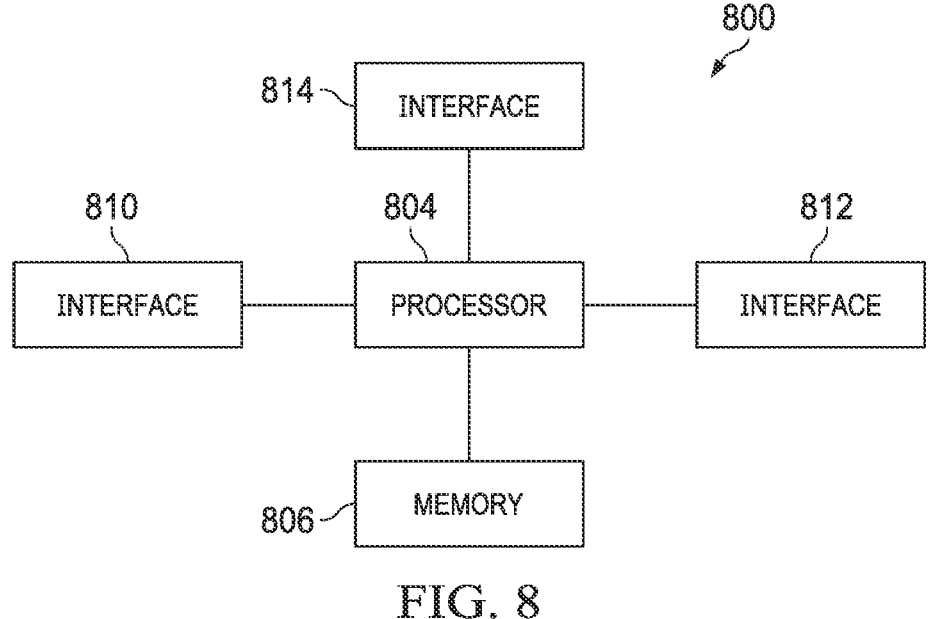
FIG. 8 illustrates a block diagram of an embodiment processing system.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 81o, 812, 814 may be any component or collection of components that allow the processing system 800 to communicate with other devices/components and/or a user. For example, one or more of the interfaces 81o, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/ communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
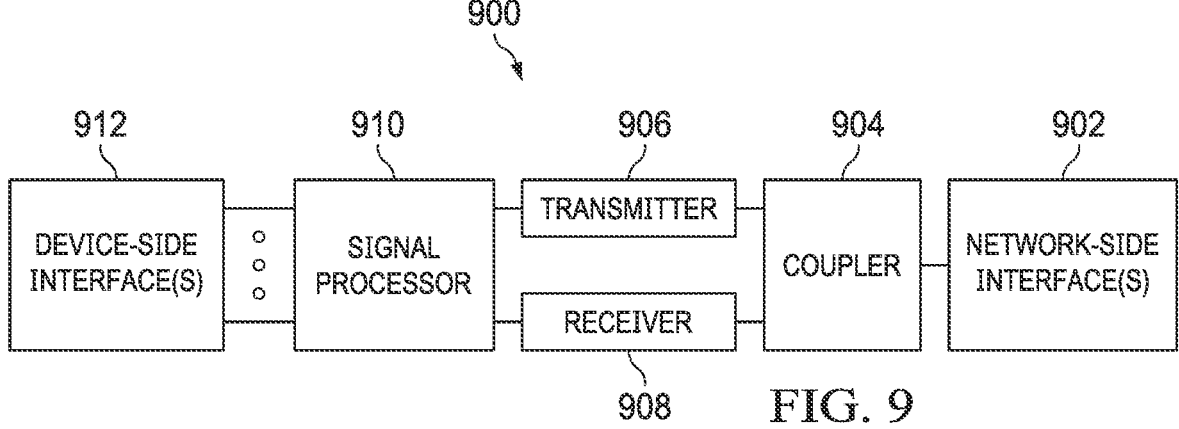
FIG. 9 illustrates a block diagram of an embodiment transceiver.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver goo comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver goo may transmit and receive signaling over any type of communications medium. In some embodiments, the transceiver goo transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module, a determining unit/module, an evaluating unit/module, a storing unit/module, a requesting unit/module, and/or a multiplexing unit/module. The respective units/modules may be hardware, software, or a combination thereof. For instance, one or more of the units/modules may be an integrated circuit, such as field programmable gate arrays (FPGAs) or application-specific integrated circuits (ASICs).

The following references are related to subject matter of the present disclosure. Each of these references is incorporated herein by reference in its entirety 3GPP TS 38.214, "3rd Generation Partnership Project; Technical Specification Group Radio Access Network; NR; Physical layer procedures for data (Release 15)", V15.3.0 (2018-09).

3GPP TS 38.211, "3rd Generation Partnership Project; Technical Specification Group Radio Access Network; NR; Physical channels and modulation (Release 15)", V15.1.0 (2018-03)

3GPP TS 38.331, "3rd Generation Partnership Project; Technical Specification Group Radio Access Network; NR; Radio Resource Control (RRC) protocol specification (Release 15)", V15.2.1 (2018-06).

3GPP TS 38.213, "3rd Generation Partnership Project; Technical Specification Group Radio Access Network; NR; Physical layer procedures for control (Release 15)", V15.3.0 (2018-09).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:

transmitting, by a network controller to a communication device, a sounding reference signal (SRS) configuration in radio resource control (RRC) signaling, the SRS configuration indicating an SRS resource set comprising a set of SRSs and an SRS bandwidth configured for transmitting the SRS resource set;

transmitting, by the network controller to the communication device, a first message after the transmitting the SRS configuration, the first message being in downlink control information (DCI) signaling, a frequency domain resource assignment field of the first message indicating a portion of the SRS bandwidth configured in the SRS configuration, the portion of the SRS bandwidth for use in transmission of the SRS resource set, the portion of the SRS bandwidth being smaller than the SRS bandwidth, wherein the first message is in a first DCI format to schedule a physical uplink shared channel (PUSCH), the first DCI format comprising the frequency domain resource assignment field specifying the portion of the SRS bandwidth, wherein the first message is in a second DCI format to schedule a physical downlink shared channel (PDSCH), the second DCI format comprising the frequency domain resource assignment field specifying the portion of the SRS bandwidth, or wherein the first message is in a group DCI format, the group DCI format comprising the frequency domain resource assignment field specifying the portion of the SRS bandwidth; and receiving, by the network controller from the communication device, the SRS resource set in the portion of the SRS bandwidth.

2. The method of claim 1, wherein the frequency domain resource assignment field explicitly indicates the portion of the SRS bandwidth.

3. The method of claim 1, wherein the SRS configuration further indicates a set of antenna ports for transmitting the SRS resource set, wherein the first DCI format, the second DCI format, or the group DCI format further includes a second field indicating a subset of antenna ports in the set of antenna ports, and wherein the frequency domain resource assignment field and the second field are different fields.

4. The method of claim 1, wherein the frequency domain resource assignment field includes at least 2 bits specifying the portion of the SRS bandwidth.

5. The method of claim 1, wherein the SRS bandwidth comprises a set of resource blocks (RBs) and the portion of the SRS bandwidth comprises a subset of the set of RBs.

6. A method comprising:

receiving, by a communication device from a network controller, a sounding reference signal (SRS) configuration in radio resource control (RRC) signaling, the SRS configuration indicating an SRS resource set comprising a set of SRSs and an SRS bandwidth configured for transmitting the SRS resource set;

receiving, by the communication device from the network controller, a first message after the receiving the SRS configuration, the first message being in downlink control information (DCI) signaling, a frequency domain resource assignment field of the first message indicating a portion of the SRS bandwidth configured in the SRS configuration, the portion of the SRS bandwidth for use in transmission of the SRS resource set, the portion of the SRS bandwidth being smaller than the SRS bandwidth, wherein the first message is in a first DCI format to schedule a physical uplink shared channel (PUSCH), the first DCI format comprising the frequency domain resource assignment field specifying the portion of the SRS bandwidth, wherein the first message is in a second DCI format to schedule a physical downlink shared channel (PDSCH), the second DCI format comprising the frequency domain resource assignment field specifying the portion of the SRS bandwidth, or wherein the first message is in a group DCI format, the group DCI format comprising the frequency domain resource assignment field specifying the portion of the SRS bandwidth; and transmitting, by the communication device to the network controller, the SRS resource set in the portion of the SRS bandwidth.

7. The method of claim 6, wherein the frequency domain resource assignment field explicitly indicates the portion of the SRS bandwidth.

8. The method of claim 6, wherein the SRS configuration further indicates a set of antenna ports for transmitting the SRS resource set, wherein the first DCI format, the second DCI format, or the group DCI format further includes a second field indicating a subset of antenna ports in the set of antenna ports, and wherein the frequency domain resource assignment field and the second field are different fields.

9. The method of claim 6, wherein the frequency domain resource assignment field includes at least 2 bits specifying the portion of the SRS bandwidth.

10. The method of claim 6, wherein the SRS bandwidth comprises a set of resource blocks (RBs) and the portion of the SRS bandwidth comprises a subset of the set of RBs.

11. A network controller comprising:

at least one processor; and a non-transitory computer readable storage medium storing programming, the programming including instructions that, when executed by the at least one processor, cause the network controller to perform operations including:

transmitting, to a communication device, a sounding reference signal (SRS) configuration in radio resource control (RRC) signaling, the SRS configuration indicating an SRS resource set comprising a set of SRSs and an SRS bandwidth configured for transmitting the SRS resource set;

transmitting, to the communication device, a first message after the transmitting the SRS configuration, the first message being in downlink control information (DCI) signaling, a frequency domain resource assignment field of the first message indicating a portion of the SRS bandwidth configured in the SRS configuration, the portion of the SRS bandwidth for use in transmission of the SRS resource set, the portion of the SRS bandwidth being smaller than the SRS bandwidth, wherein the first message is in a first DCI format to schedule a physical uplink shared channel (PUSCH), the first DCI format comprising the frequency domain resource assignment field specifying the portion of the SRS bandwidth, wherein the first message is in a second DCI format to schedule a physical downlink shared channel (PDSCH), the second DCI format comprising the frequency domain resource assignment field specifying the portion of the SRS bandwidth, or wherein the first message is in a group DCI format, the group DCI format comprising the frequency domain resource assignment field specifying the portion of the SRS bandwidth; and receiving, from the communication device, the SRS resource set in the portion of the SRS bandwidth.

12. The network controller of claim 11, wherein the frequency domain resource assignment field explicitly indicates the portion of the SRS bandwidth.

13. The network controller of claim 11, wherein the SRS configuration further indicates a set of antenna ports for transmitting the SRS resource set, wherein the first DCI format, the second DCI format, or the group DCI format further includes a second field indicating a subset of antenna ports in the set of antenna ports, and wherein the frequency domain resource assignment field and the second field are different fields.

14. The network controller of claim 11, wherein the frequency domain resource assignment field includes at least 2 bits specifying the portion of the SRS bandwidth.

15. The network controller of claim 11, wherein the SRS bandwidth comprises a set of resource blocks (RBs) and the portion of the SRS bandwidth comprises a subset of the set of RBs.

16. A communication device comprising:

at least one processor; and a non-transitory computer readable storage medium storing programming, the programming including instructions that, when executed by the at least one processor, cause the communication device to perform operations including:

receiving, from a network controller, a sounding reference signal (SRS) configuration in radio resource control (RRC) signaling, the SRS configuration indicating an SRS resource set comprising a set of SRSs and an SRS bandwidth configured for transmitting the SRS resource set;

receiving, from the network controller, a first message after the receiving the SRS configuration, the first message being in downlink control information (DCI) signaling, a frequency domain resource assignment field of the first message indicating a portion of the SRS bandwidth configured in the SRS configuration, the portion of the SRS bandwidth for use in transmission of the SRS resource set, the portion of the SRS bandwidth being smaller than the SRS bandwidth, wherein the first message is in a first DCI format to schedule a physical uplink shared channel (PUSCH), the first DCI format comprising the frequency domain resource assignment field specifying the portion of the SRS bandwidth, wherein the first message is in a second DCI format to schedule a physical downlink shared channel (PDSCH), the second DCI format comprising the fre-quency domain resource assignment field specifying the portion of the SRS bandwidth, or wherein the first message is in a group DCI format, the group DCI format comprising the frequency domain resource assignment field specifying the portion of the SRS bandwidth; and transmitting, to the network controller, the SRS resource set in the portion of the SRS bandwidth.

17. The communication device of claim 16, wherein the frequency domain resource assignment field explicitly indicates the portion of the SRS bandwidth.

18. The communication device of claim 16, wherein the SRS configuration further indicates a set of antenna ports for transmitting the SRS resource set, wherein the first DCI format, the second DCI format, or the group DCI format further includes a second field indicating a subset of antenna ports in the set of antenna ports, and wherein the frequency domain resource assignment field and the second field are different fields.

19. The communication device of claim 16, wherein the frequency domain resource assignment field includes at least 2 bits specifying the portion of the SRS bandwidth.

20. The communication device of claim 16, wherein the SRS bandwidth comprises a set of resource blocks (RBs) and the portion of the SRS bandwidth comprises a subset of the set of RBs.

\* \* \* \* \*